May 25, 1954 — M. SAWYER ET AL — 2,679,402
FOLDABLE WHEEL MOUNTING FOR GOLF CARTS
Filed May 28, 1951 — 2 Sheets-Sheet 1
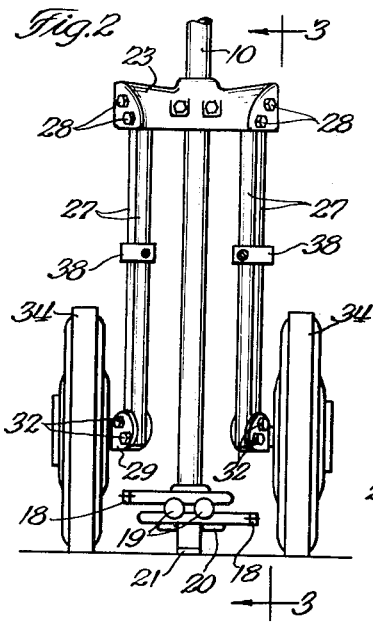
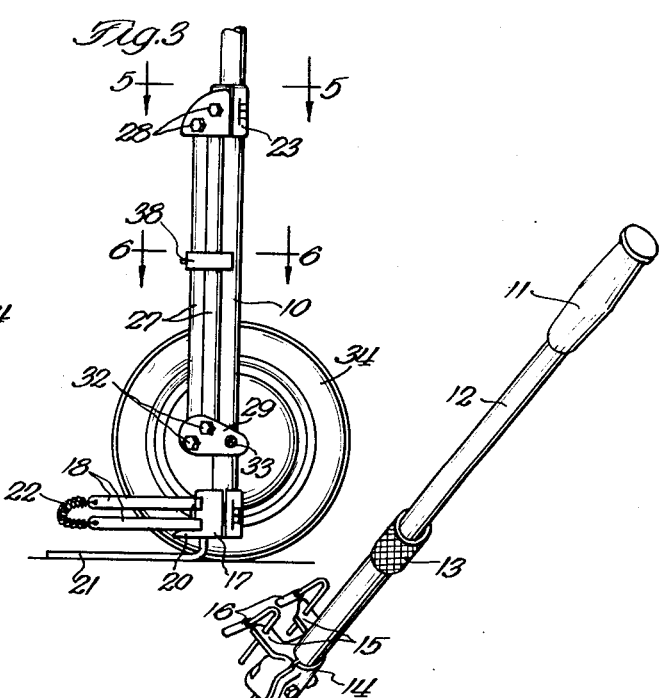
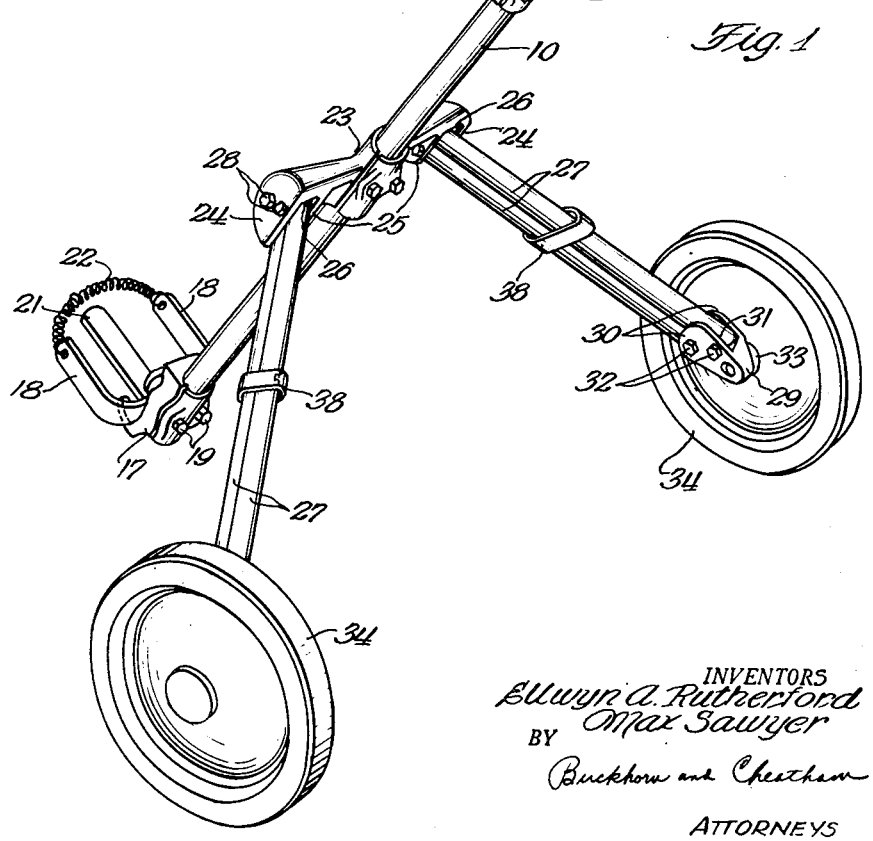
INVENTORS
Elwyn A. Rutherford
Max Sawyer
BY
Buckhorn and Cheatham
ATTORNEYS May 25, 1954   M. SAWYER ET AL   2,679,402
FOLDABLE WHEEL MOUNTING FOR GOLF CARTS
Filed May 28, 1951   2 Sheets-Sheet 2
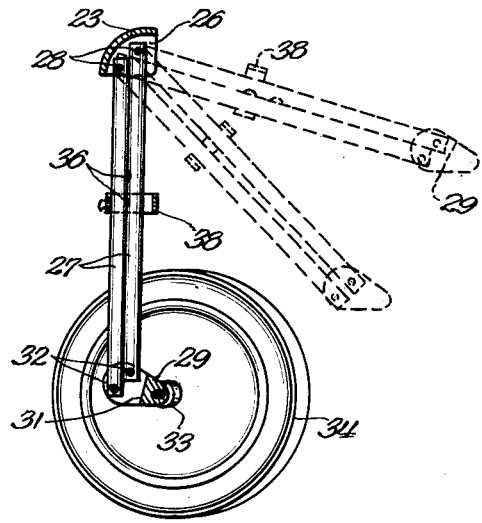
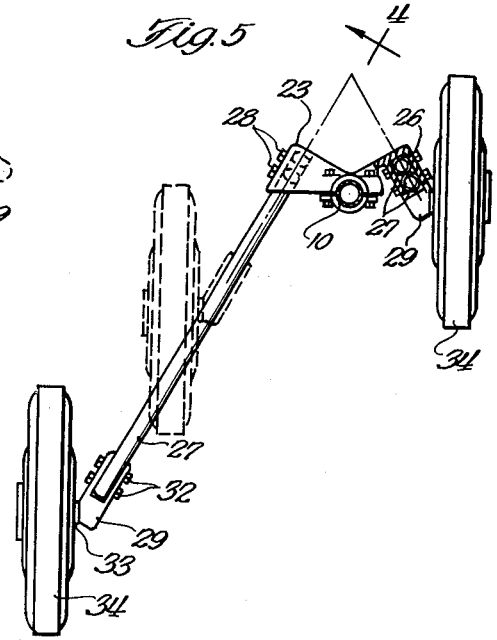
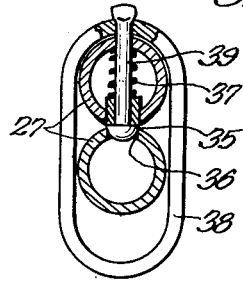
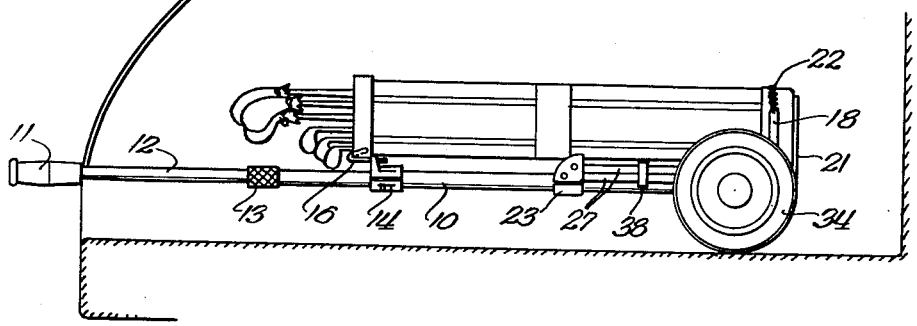
INVENTORS
Elwyn A. Rutherford
Max Sawyer
BY
Buckhorn and Cheatham
ATTORNEYS Patented May 25, 1954

2,679,402

UNITED STATES PATENT OFFICE 2,679,402

FOLDABLE WHEEL MOUNTING FOR GOLF CARTS

Max Sawyer, Portland, and Ellwyn A. Rutherford, Gladstone, Oreg., assignors to Rutherford & Sawyer Mfg. Co., Portland, Oreg., a partnership composed of said Sawyer and said Rutherford Application May 28, 1951, Serial No. 228,682

5 Claims. (Cl. 280—41)

The present invention relates generally to collapsible hand carts of the type which is ordinarily used for transporting golf bags.

The principal object of the present invention is to provide a device of the character described comprising a pair of wheels and means mounting said wheels so that they may be swung together closely adjacent the elongated frame of the cart or swung apart in extended relation to each other, the arrangement being such that the wheels remain substantially parallel to each other at all times whereby the cart may be wheeled about in collapsed condition as well as in its extended condition. This object is of particular utility to owners who wish to transport their golf clubs from place to place, since the collapsed cart may be wheeled into the trunk compartment of an automobile or guided through narrow confines, thus protecting the user against injury from lifting the loaded device around obstructions or into vehicles.

A further object of the present invention is to provide a device of the character described which is of sturdy and simple construction, all parts of which may be easily manufactured and assembled.

The objects and advantages of the present invention may be more readily ascertained by inspection of the accompanying drawing taken in connection with the following description wherein like numerals refer to like parts throughout.

In the drawing,

Fig. 1 is a view in perspective taken from the side and rear of a cart in opened condition;

Fig. 2 is a partial front view of a cart standing upright when in collapsed condition;

Fig. 3 is a view partially in section taken substantially from the plane of the line 3—3 of Fig. 2;

Fig. 4 is a partial view of one leg of the vehicle taken substantially from the plane of the line 4—4 of Fig. 5, showing the leg in extended position in full lines and in other positions in broken lines;

Fig. 5 is a section taken substantially along the line 5—5 of Fig. 3, showing one leg in collapsed condition and the other leg in fully extended position in full lines and in partially extended position in broken lines;

Fig. 6 is a horizontal section, on an enlarged scale, taken substantially along line 6—6 of Fig. 3; and Fig. 7 is a partially schematic view of an automobile trunk compartment illustrating the manner of positioning a collapsed cart carrying a golf bag therein.

The vehicle comprises an elongated frame upon which a golf bag or the like may be positioned, the principal member of the frame being a tube 10. A handle 11 is provided, the same preferably being positioned at the end of a smaller tube 12 telescoped into the upper end of the tube 10, its relative position being maintainable by suitable knurled clamping means 13. Means to support a bag are provided, such as the upper split clamp 14 from which extend a pair of perforated lugs 15, through the perforations of which extend slidable hooks 16 adapted to engage the rim of the mouth of the golf bag. Similarly, at the lower end of the tube 10 there is provided a split clamp 17 from which a pair of bag embracing arms 18 extend forwardly, the relative spacing of the arms being adjustable upon loosening the bolts 19 which hold the clamp in position. It is to be appreciated that the clamp 17 is identical with the clamp 14, thereby reducing the number of parts to manufacture. In this instance, however, ears 20 are placed at the lower end of the clamp so as to provide means to embrace the upper leg of an L-shaped member 21 which projects forwardly in position to engage the bottom of the bag. A coil spring 22 extends between the free ends of the arms 18 so as to provide means to embrace the bag and hold it in position at the lower end of the cart.

The bag is further maintained in position by an intermediate saddle bracket 23 including a split portion which clamps about the tube 10. At the outer end of each arm of the bracket 23 there are provided a pair of parallel depending portions 24 and 25 defining a downwardly and rearwardly opening slot 26. The sides of the slots comprise supporting surfaces lying in planes parallel to the axis of said handle and at an acute angle to each other. Leg means are pivotally mounted in each slot 26, the leg means comprising a pair of rods 27 having their upper ends retained in the slot by a pair of pivot bolts 28, a wheel support 29 having a pair of ears 30 defining a slot 31 in which the lower ends of the rods 27 are received, and a pair of lower pivot bolts 32. The sides of the slots 31 comprise plane surfaces parallel to said supporting surfaces defined by the slots 26. The upper pivot bolts 28 extend normal to the supporting surfaces and retain the rods 27 in swinging contact therewith, and the lower pivot bolts 32 extend normal to the plane surfaces defined by the slots 31 and retain the rods in swinging contact therewith. The rods 27 and lines drawn between the bolts 28 and the bolts 32 define a parallelogram of such nature that the rods 27 contact each other throughout their length when the leg means is at either limit of movement as seen most clearly in Fig. 4. The angular relationship of the slots 26 to each other and to the tube 10 is such that lines bisecting the slots 26 intersect at a point in a plane directly above the axis of the tube 10 and bisecting the saddle as seen in Fig. 5. The wheel supports 29 include outwardly extending spindles 33 which lie along a common transverse axis intersecting the axis of the tube 10 when the vehicle is collapsed as seen in Fig. 3. As such the spindles remain parallel at all times regardless of the relative positioning of one of the leg means to the other, and, therefore, the wheels 34 mounted on the spindles 33 remain parallel to each other at all times. The relationship is preferably such that when the leg means are in collapsed condition as seen in Fig. 3 the forward tips of the wheels are substantially in the plane of the lower surface of the member 21, thereby providing a tripod support for holding the cart upright when collapsed. The relationship is also such that the wheels project beneath the frame so that the cart may be rolled about in collapsed condition as illustrated in Fig. 7. When the legs are in collapsed position the rods 27 extend longitudinally of the frame in substantially parallel relation to each other as seen in Figs. 2 and 3, and when the cart is in opened condition the legs extend outwardly and downwardly in divergent relation to each other as seen in Fig. 1.

In order to hold the leg means in either limit of movement there is provided latching means comprising a plunger 39 extending transversely of one of the rods 27, the plunger having a latch end 35 projecting outwardly through an opening in the rod toward the other rod. The other rod is provided with a longitudinally spaced pair of openings 36 into either of which the tip of the plunger may project when forced outwardly by a spring 37 surrounding the stem of the plunger and biasing the plunger outwardly. The opposite end of the plunger extends through an opposed opening in the rod and through an opening in one end of a band 38 loosely embracing both rods, the end of the plunger being upset against the outer surface of the band. The band 38 is in the shape of a flattened oval of sufficient length along its major axis to permit the rods to swing apart in traversing from one limit to another. When the rods are close together at the limit positions the end of the band opposite the upset end of the plunger 39 may be depressed to withdraw the plunger from the opening 36 with which it is engaged. While the leg is being swung to the opposite position the band may be released and the plunger will snap into the opening 36 to retain the leg means in the other limit position.

It will be appreciated that our construction provides means for independent swinging movement of the wheels from a collapsed relationship to each other to the extended relationship and that the leg means are firmly latched in either limit position.

Having illustrated and described a preferred embodiment of our invention, it will be apparent to those skilled in the art that the invention permits of modification in arrangement and detail. We claim as our invention all such modifications as come within the scope of the appended claims.

We claim:

1. A device of the character described comprising an elongated supporting frame, a pair of leg means, bracket means pivotally and independently attaching said leg means to said frame for independent swinging movement from one position in substantial parallelism to each other lengthwise of said frame to a second position in divergent relation to each other extending outwardly from said frame, a pair of wheel supports each mounted on the free end of one of said leg means, and a pair of wheels each rotatably mounted on one of said wheel supports, said wheels being maintained in parallel relation to each other regardless of the relative positions of said leg means to each other, each of said leg means comprising a pair of rods, an upper pair of pivots respectively attaching the upper ends of said rods to said bracket means, a lower pair of pivots respectively attaching the lower ends of said rods to the respective wheel support, the axes of said rods and lines connecting the pivots of each pair forming a parallelogram, and said rods engaging each other throughout their length at the limit of swinging movement of said leg means in either direction.

2. A device of the character described comprising an elongated supporting frame, a pair of leg means, bracket means pivotally and independently attaching said leg means to said frame for independent swinging movement from one position in substantial parallelism to each other lengthwise of said frame to a second position in divergent relation to each other extending outwardly from said frame, a pair of wheel supports each mounted on the free end of one of said leg means, and a pair of wheels each rotatably mounted on one of said wheel supports, said wheels being maintained in parallel relation to each other regardless of the relative positions of said leg means to each other, each of said leg means comprising a pair of rods, an upper pair of pivots respectively attaching the upper ends of said rods to said bracket means, a lower pair of pivots respectively attaching the lower end of said rods to the respective wheel support, the axes of said rods and lines connecting the pivots of each pair forming a parallelogram, said rods engaging each other throughout their length at the limit of swinging movement of said leg means in either direction, and latch means associated with said rods to retain said leg means at either limit of movement.

3. A device of the character described comprising an elongated supporting frame, a pair of leg means, bracket means pivotally and independently attaching said leg means to said frame for independent swinging movement from one position in substantial parallelism to each other lengthwise of said frame to a second position in divergent relation to each other extending outwardly from said frame, a pair of wheel supports each mounted on the free end of one of said leg means, and a pair of wheels each rotatably mounted on one of said wheel supports, said wheels being maintained in parallel relation to each other regardless of the relative positions of said leg means to each other, each of said leg means comprising a pair of rods, an upper pair of pivots respectively attaching the upper ends of said rods to said bracket means, a lower pair of pivots respectively attaching the lower ends of said rods to the respective wheel support, the axes of said rods and lines connecting the pivots of each pair forming a parallelogram, said rods engaging each other throughout their length at the limit of swinging movement of said leg means in either direction, and latch means associated with said rods to retain said leg means at either limit of movement comprising a plunger movably mounted in one of said rods, said rod having an opening toward the other of said rods through which said plunger may project, spring means urging said plunger outwardly, said other rod having a spaced pair of openings into one of which said plunger may project when said leg means is at one of its limits of movement, and manually engageable means to retract said plunger.

4. A device of the character described comprising an elongated supporting frame, a pair of leg means, bracket means pivotally and independently attaching said leg means to said frame for independent swinging movement from one position in substantial parallelism to each other lengthwise of said frame to a second position in divergent relation to each other extending outwardly from said frame, a pair of wheel supports each mounted on the free end of one of said leg means, and a pair of wheels each rotatably mounted on one of said wheel supports, said wheels being maintained in parallel relation to each other regardless of the relative positions of said leg means to each other, each of said leg means comprising a pair of rods, an upper pair of pivots respectively attaching the upper ends of said rods to said bracket means, a lower pair of pivots respectively attaching the lower ends of said rods to the respective wheel support, the axes of said rods and lines connecting the pivots of each pair forming a parallelogram, said rods engaging each other throughout their length at the limit of swinging movement of said leg means in either direction, and latch means associated with said rods to retain said leg means at either limit of movement comprising a plunger movably mounted in one of said rods, said rod having an opening toward the other of said rods through which said plunger may project, spring means urging said plunger outwardly, said other rod having a spaced pair of openings into one of which said plunger may project when said leg means is at one of its limits of movement, and manually engageable means to retract said plunger comprising a band loosely embracing both of said rods and connected to said plunger.

5. A device of the character described comprising an elongated supporting handle, a pair of leg means each comprising a parallel pair of rods, a bracket mounted on said handle, said bracket comprising a pair of supporting surfaces lying in planes parallel to the axis of said handle and at an acute angle to each other, a pair of upper pivot means each comprising a pair of upper pivots extending normal to one of said supporting surfaces and each pair thereof respectively attaching the upper ends of a pair of said rods to one of said supporting surfaces in swinging contact therewith, a pair of wheel supports each comprising plane surfaces parallel to said supporting surfaces, a pair of lower pivot means each comprising a pair of lower pivots extending normal to one of said plane surfaces and each pair thereof respectively attaching the lower ends of a pair of said rods to one of said wheel supports in swinging contact with said plane surfaces, said wheel supports comprising outwardly extending spindles which lie along parallel, transverse axes, and a pair of wheels respectively mounted on said spindles, said leg means each being independently movable from one position substantially parallel to said handle to a second position extending outwardly and downwardly at an acute angle with respect to each other and to said handle, each pair of said rods and the respective pivot means associated therewith defining a parallelogram, and said rods of each pair engaging each other throughout their lengths when said leg means are at either of said positions whereby the axes of said wheel spindles assume positions along common transverse lines when said leg means are both parallel to said handle and when they are both extended.

References Cited in the file of this patent

UNITED STATES PATENTS

| Number | Name | Date |
|---|---|---|
| 2,523,893 | Williamson | Sept. 26, 1950 |
| 2,564,828 | Alexander | Aug. 21, 1951 |
| 2,574,232 | Welsh | Nov. 6, 1951 |
| 2,626,814 | Chamberlin | Jan. 27, 1953 |